(12) United States Patent
Okuma

(10) Patent No.: US 12,522,242 B2
(45) Date of Patent: Jan. 13, 2026

(54) MAP EVALUATION APPARATUS

(71) Applicant: Honda Motor Co., Ltd., Tokyo (JP)

(72) Inventor: Yuki Okuma, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 18/535,977

(22) Filed: Dec. 11, 2023

(65) Prior Publication Data

US 2024/0199069 A1    Jun. 20, 2024

(30) Foreign Application Priority Data

Dec. 16, 2022   (JP) .................................. 2022-200813

(51) Int. Cl.
*B60W 60/00* (2020.01)
*B60W 50/14* (2020.01)
*G01C 21/00* (2006.01)

(52) U.S. Cl.
CPC .......... *B60W 60/001* (2020.02); *B60W 50/14* (2013.01); *G01C 21/3815* (2020.08); *B60W 2552/53* (2020.02); *B60W 2556/40* (2020.02)

(58) Field of Classification Search
CPC ............... B60W 60/001; B60W 50/14; B60W 2552/53; G01C 21/3815
See application file for complete search history.

(56) References Cited

U.S. PATENT DOCUMENTS

| | | | |
|---|---|---|---|
| 2007/0198156 A1* | 8/2007 | Yamada ................ | B60Q 1/085 701/532 |
| 2013/0211656 A1* | 8/2013 | An ....................... | G05D 1/0274 701/25 |
| 2016/0327400 A1* | 11/2016 | Shikimachi ............ | G01C 21/30 |
| 2019/0196486 A1* | 6/2019 | Ishikawa .............. | G06V 20/597 |
| 2019/0227545 A1* | 7/2019 | Yoo ...................... | G05D 1/0223 |
| 2020/0125860 A1* | 4/2020 | Hyun ..................... | G06T 7/11 |
| 2021/0033406 A1* | 2/2021 | Watanabe .............. | G01C 21/32 |
| 2022/0067398 A1* | 3/2022 | Tamura ............. | B60W 60/0053 |
| 2022/0113162 A1* | 4/2022 | Nomura ................ | G09B 29/00 |
| 2022/0291013 A1* | 9/2022 | Konishi ............ | G01C 21/3896 |
| 2022/0299341 A1* | 9/2022 | Zhang .................... | G06F 16/29 |
| 2023/0242108 A1* | 8/2023 | Ito ........................ | B60W 30/12 701/23 |
| 2023/0242109 A1* | 8/2023 | Kizumi ................ | B60W 30/12 701/23 |

(Continued)

FOREIGN PATENT DOCUMENTS

| | | | | |
|---|---|---|---|---|
| CN | 115900683 A | * | 4/2023 | ......... G01C 21/3822 |
| JP | 2010223901 A | | 10/2010 | |

*Primary Examiner* — Wilson W Tsui
*Assistant Examiner* — David Faber
(74) *Attorney, Agent, or Firm* — Duft & Bornsen, PC

(57) ABSTRACT

An apparatus for evaluating the reliability of a map used in autonomous driving. The apparatus recognizes an external situation around a subject vehicle, stores recognition information including recognition results in the memory, and generates a map based on the recognition results. The apparatus calculates an evaluation reference value to be used for evaluation of the map based on the recognition information stored in the memory, and determines a reliability of the map based on a deviation between the recognition information used to calculate the evaluation reference value and the evaluation reference value.

10 Claims, 6 Drawing Sheets

(56) References Cited

U.S. PATENT DOCUMENTS

| | | | | |
|---|---|---|---|---|
| 2023/0260293 | A1* | 8/2023 | Goto | G06V 10/98 |
| | | | | 382/104 |
| 2023/0314166 | A1* | 10/2023 | Okuma | G01C 21/3822 |
| | | | | 701/411 |
| 2024/0077585 | A1* | 3/2024 | Konishi | G01C 21/3848 |
| 2024/0326872 | A1* | 10/2024 | Konishi | G06V 20/58 |
| 2024/0384996 | A1* | 11/2024 | Sakadani | G01C 21/30 |

* cited by examiner

US 12,522,242 B2

1
MAP EVALUATION APPARATUS

CROSS-REFERENCE TO RELATED APPLICATION

This application is based upon and claims the benefit of priority from Japanese Patent Application No. 2022-200813 filed on Dec. 16, 2022, the content of which is incorporated herein by reference.

BACKGROUND OF THE INVENTION

Field of the Invention

The present invention relates to a map evaluation apparatus that evaluates an accuracy of map information.

Description of the Related Art

In the related art, there are devices configured to analyze a captured image acquired by an in-vehicle camera and recognize a situation of a road on which a subject vehicle has traveled (for example, see JP 2010-223901 A). A device described in JP 2010-223901 A determines a content of an error in map data on the basis of a recognized road situation when a subject vehicle departs from a guidance route to a destination generated on the basis of the map data.

However, as in the device described in JP 2010-223901 A, it is difficult to efficiently evaluate the map data if the error in the map data is detected when the subject vehicle departs from the guidance route.

SUMMARY OF THE INVENTION

An aspect of the present invention is a map evaluation apparatus including a microprocessor and a memory coupled to the microprocessor. The microprocessor is configured to perform: recognizing an external situation around a subject vehicle; storing recognition information including a recognition result in the recognizing in the memory; generating a map based on the recognition result; calculating an evaluation reference value to be used for evaluation of the map based on the recognition information stored in the memory; and calculating a reliability of the map based on a deviation of the recognition information used to calculate the evaluation reference value from the evaluation reference value.

BRIEF DESCRIPTION OF THE DRAWINGS

The objects, features, and advantages of the present invention will become clearer from the following description of embodiments in relation to the attached drawings, in which.

2

Figure 2:
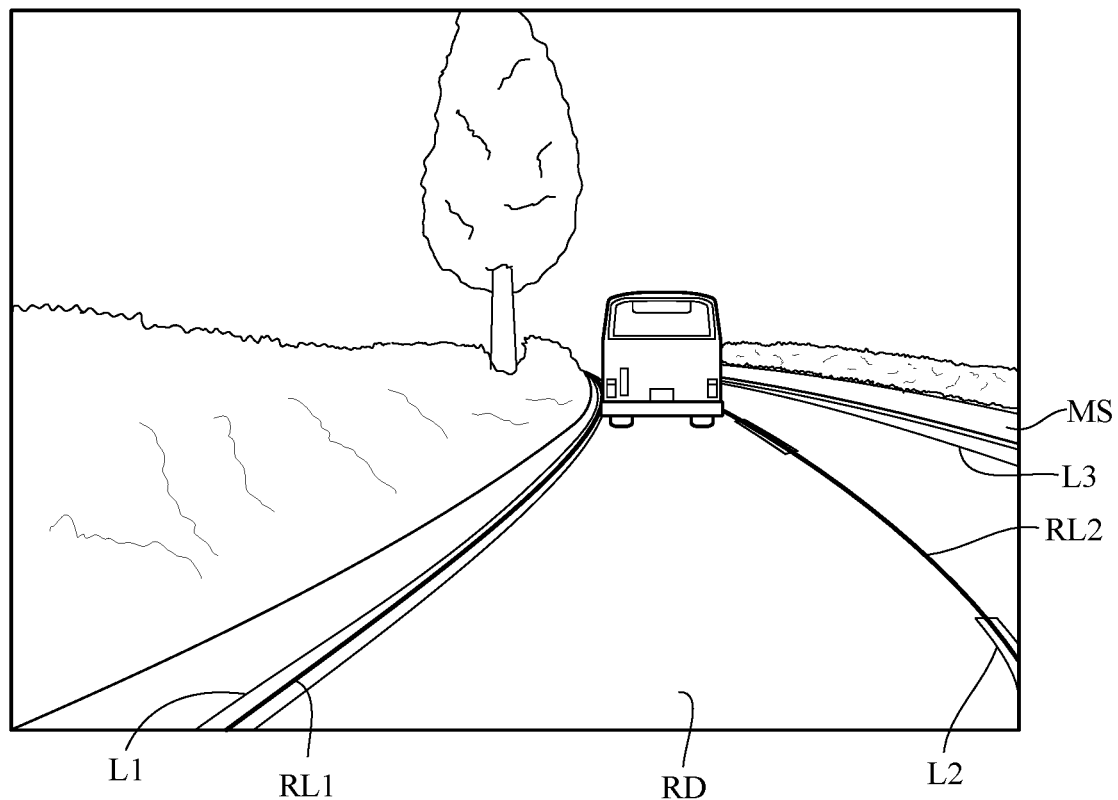
FIG. 2 is a view schematically illustrating virtual division lines included in a map.
Figure 3:
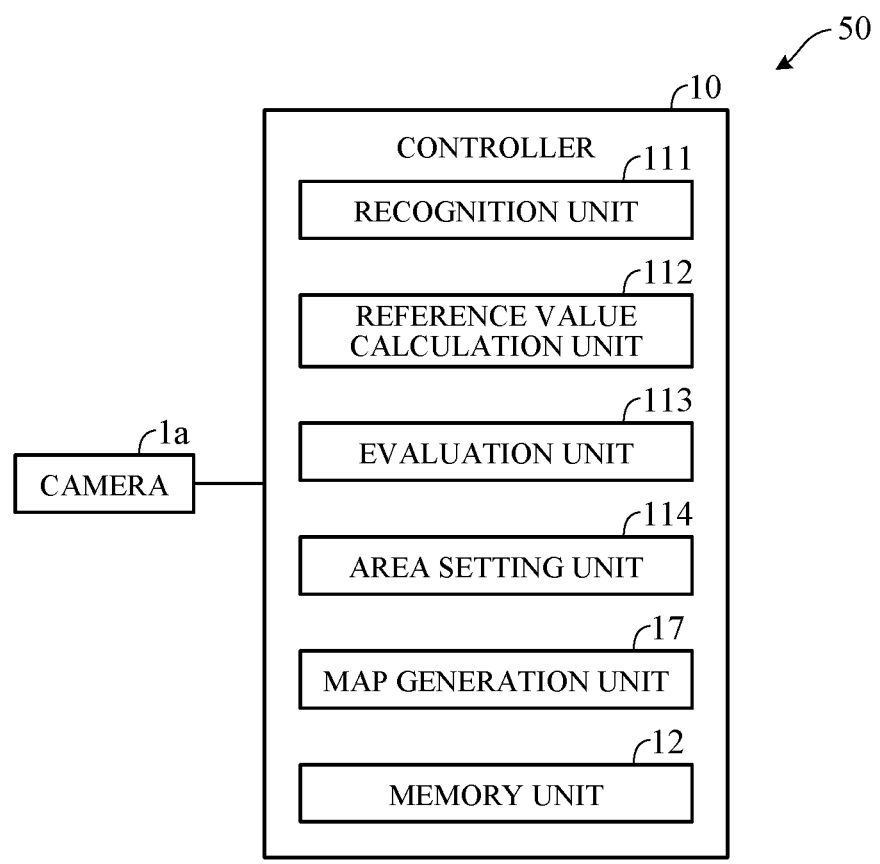
FIG. 3 is a block diagram illustrating a main configuration of the map evaluation apparatus 50 according to the embodiment of the present invention.
Figure 4A:
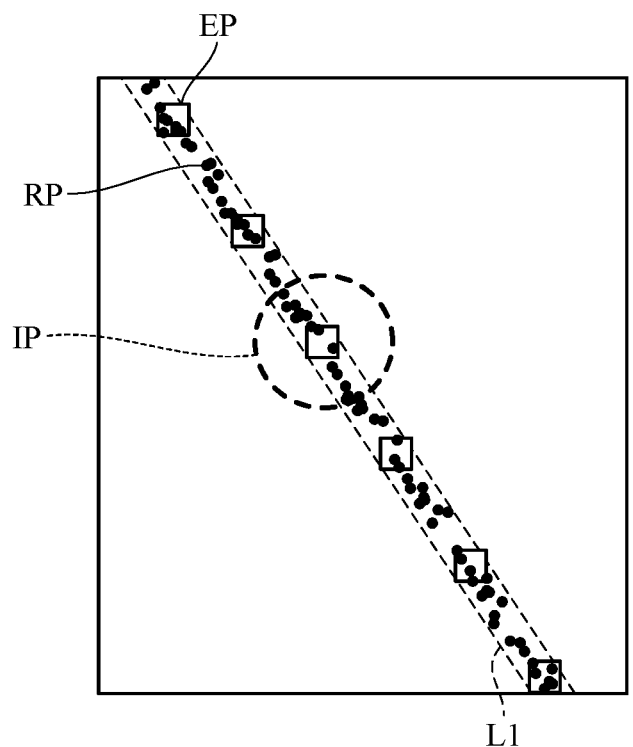
FIG. 4A is a view illustrating an example of recognition information including a recognition result of the division line of FIG. 2.
Figure 4B:
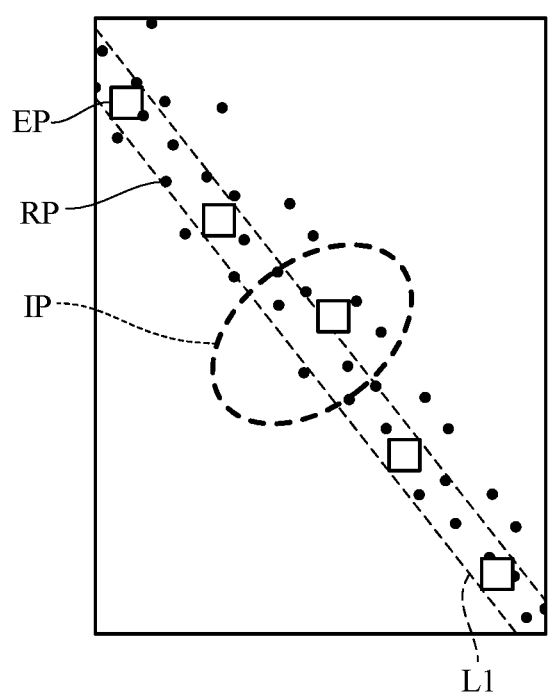
Figure 5A:
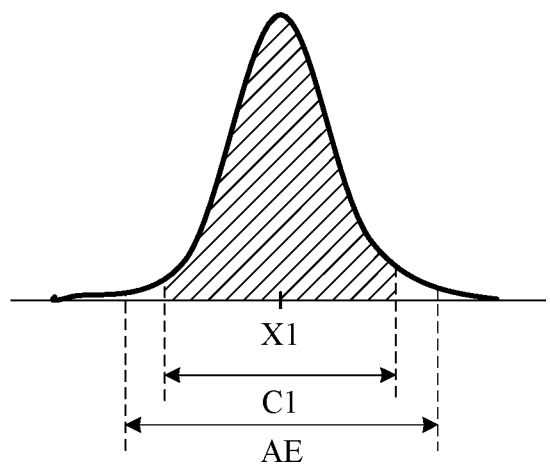
Figure 5B:
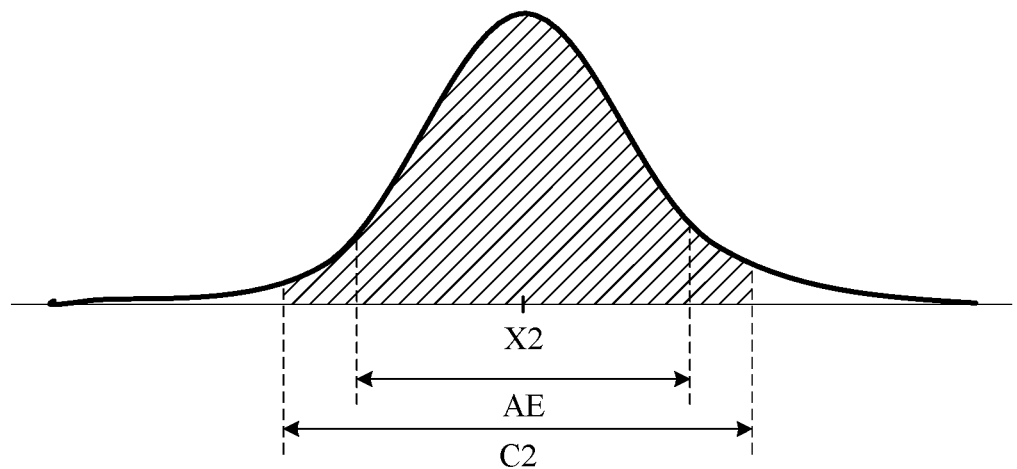
Figure 6:
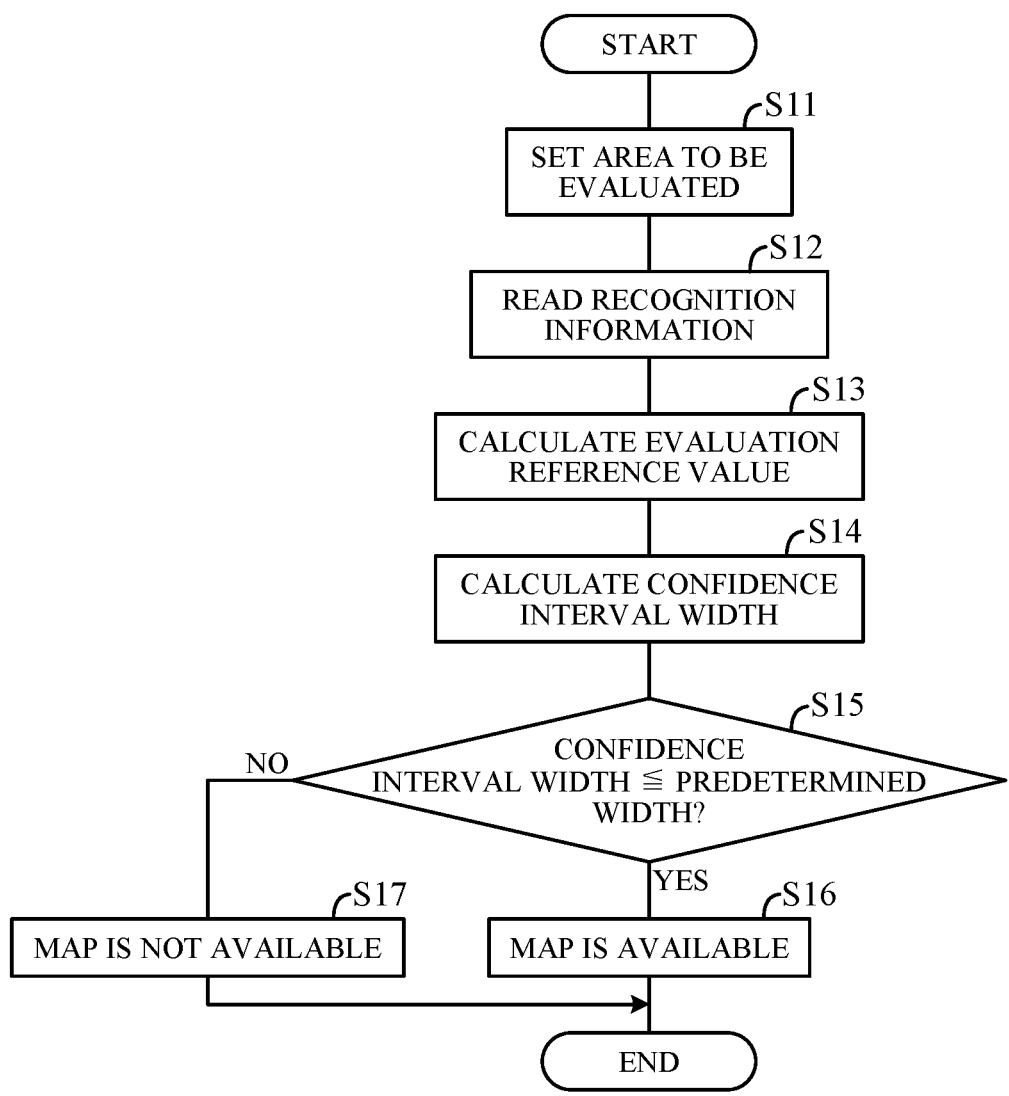

FIG. 4B is a view illustrating another example of recognition information including a recognition result of the division line of FIG. 2;

FIG. 5A is a view for describing a confidence interval for an evaluation reference value;

FIG. 5B is a view for describing the confidence interval for the evaluation reference value; and FIG. 6 is a flowchart illustrating an example of processing executed by the controller in FIG. 3.

DETAILED DESCRIPTION OF THE INVENTION

Hereinafter, an embodiment of the present invention will be described with reference to FIGS. 1 to 6. A map evaluation apparatus according to the embodiment of the present invention is mounted on, for example, a vehicle including a self-driving capability, that is, a self-driving vehicle. Note that a vehicle on which the map evaluation apparatus according to the present embodiment is mounted may be referred to as a subject vehicle as distinguished from other vehicles. The subject vehicle may be any of an engine vehicle including an internal combustion engine (engine) as a driving power source, an electric vehicle including a driving motor as the driving power source, and a hybrid vehicle including an engine and a driving motor as the driving power sources. The subject vehicle can travel not only in a self-drive mode in which driving operation by a driver is unnecessary, but also in a manual drive mode with driving operation by the driver.

Figure 1:
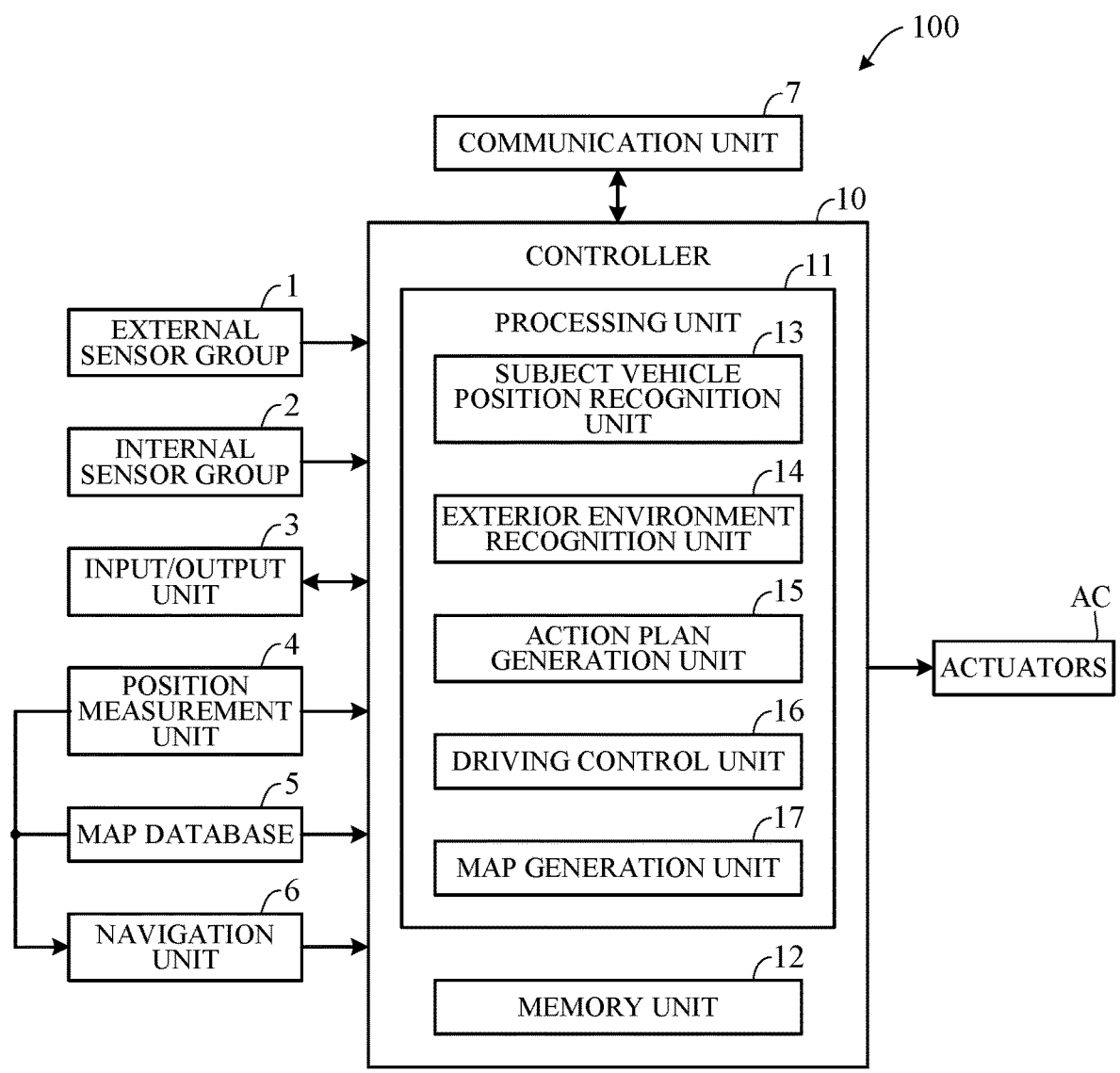
FIG. 1 is a block diagram schematically illustrating an overall configuration of a vehicle control system including a map evaluation apparatus according to an embodiment of the present invention.

First, a schematic configuration of the subject vehicle related to self-driving will be described. FIG. 1 is a block diagram schematically illustrating an overall configuration of a vehicle control system 100 of the subject vehicle including a map evaluation apparatus according to the embodiment of the present invention. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and traveling actuators AC each communicably connected to the controller 10.

The external sensor group 1 is a generic term for a plurality of sensors (external sensors) that detect an external situation which is peripheral information of the subject vehicle. For example, the external sensor group 1 includes a LiDAR that measures scattered light with respect to irradiation light in all directions of the subject vehicle and measures a distance from the subject vehicle to a surrounding obstacle, a radar that detects other vehicles, obstacles, and the like around the subject vehicle by irradiating with electromagnetic waves and detecting reflected waves, and a camera that is mounted on the subject vehicle, has an imaging element such as a charge coupled device (CCD) or a complementary metal oxide semiconductor (CMOS), and captures images of the surrounding (front, rear, and side) of the subject vehicle.

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects an acceleration in a front-rear direction of the subject vehicle and an acceleration in a left-right direction (lateral acceleration) of the subject vehicle, a revolution sensor that detects the number of revolutions of the driving power source, and a yaw rate sensor that detects a rotation angular speed around a vertical axis of the center of gravity of the subject vehicle. The internal sensor group 2 further includes a sensor that detects driver's driving operation in a manual drive mode, for example, operation of an accelerator pedal, operation of a brake pedal, operation of a steering wheel, and the like.

The input/output device 3 is a generic term for devices via which the driver transmits or receives commands. For example, the input/output device 3 includes input devices such as various switches to which the driver inputs various commands by operating an operation member and a microphone to which the driver inputs commands by voice, output devices such as a display that provides information to the driver via a display image, a speaker that provides information to the driver by voice, and the like.

The position measurement unit (global navigation satellite system (GNSS) unit) 4 includes a positioning sensor that receives a signal for positioning, transmitted from a positioning satellite. The positioning satellite is an artificial satellite such as a global positioning system (GPS) satellite or a quasi-zenith satellite. The position measurement unit 4 uses positioning information received by the positioning sensor to measure a current position (latitude, longitude, and altitude) of the subject vehicle.

The map database 5 is a device that stores general map information used for the navigation unit 6, and includes, for example, a magnetic disk or a semiconductor element. The map information includes road position information, information on a road shape (curvature or the like), and position information on intersections and branch points. The map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated on the basis of a current position of the subject vehicle measured by the position measurement unit 4 and the map information stored in the map database 5. The current position of the subject vehicle can be measured using the detection values of the external sensor group 1, and the target route may be calculated on the basis of the current position and the highly accurate map information stored in the memory unit 12.

The communication unit 7 communicates with various servers (not illustrated) via networks including a wireless communication network represented by the Internet network, a mobile phone network, and the like, and acquires map information, travel history information, traffic information, and the like from the servers periodically or at a certain timing. The travel history information of the subject vehicle may be transmitted to the server via the communication unit 7 in addition to the acquisition of the travel history information. The networks include not only a public wireless communication network but also a closed communication network provided for every predetermined management area, for example, a wireless LAN, Wi-Fi (registered trademark), Bluetooth (registered trademark), and the like. The acquired map information is output to the map database 5 and the memory unit 12, and the map information is updated.

The actuators AC are traveling actuators for controlling traveling of the subject vehicle. In a case where the driving power source is an engine, the actuators AC include a throttle actuator that adjusts an opening (throttle opening) of a throttle valve of the engine. In a case where the driving power source is a driving motor, the driving motor is included in the actuators AC. The actuators AC also include a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), the memory unit 12 such as a ROM and a RAM, and other peripheral circuits (not illustrated) such as an I/O interface. Although a plurality of ECUs having different functions such as an engine control ECU, a driving motor control ECU, and a braking device ECU can be separately provided, in FIG. 1, the controller 10 is illustrated as a set of these ECUs for convenience.

The memory unit 12 stores highly accurate detailed road map information for automated traveling. The road map information includes road position information, information of a road shape (curvature or the like), information of a road gradient, position information of an intersection or a branch point, information of a type and a position of a division line such as a white line, information of the number of lanes, width of a lane and position information for each lane (information of a center position of a lane or a boundary line of a lane position), position information of a landmark (a traffic light, a sign, a building, or the like) as a mark on a map, and information of a road surface profile such as unevenness of a road surface. The map information stored in the memory unit 12 includes map information (referred to as external map information) acquired from the outside of the subject vehicle acquired via the communication unit 7 and map information (referred to as internal map information) created by the subject vehicle itself using detection values of the external sensor group 1 or detection values of the external sensor group 1 and the internal sensor group 2.

The external map information is, for example, information of a map acquired via a cloud server (referred to as a cloud map), and the internal map information is, for example, information of a map (referred to as an environmental map) including point cloud data generated by mapping using a technology such as simultaneous localization and mapping (SLAM). The external map information is shared between the subject vehicle and other vehicles, whereas the internal map information is map information that is exclusive to the subject vehicle (for example, map information that only the subject vehicle owns). In an area where external map information is not provided, such as a newly constructed road, an environmental map is created by the subject vehicle itself. Note that the internal map information may be provided to a server device or other vehicles via the communication unit 7. The memory unit 12 also stores information on various control programs and thresholds used in the programs.

The processing unit 11 includes a subject vehicle position recognition unit 13, an exterior environment recognition unit 14, an action plan generation unit 15, a driving control unit 16, and a map generation unit 17 as functional configurations.

The subject vehicle position recognition unit 13 recognizes the position (subject vehicle position) of the subject vehicle on a map, on the basis of the position information of the subject vehicle, obtained by the position measurement unit 4, and the map information of the map database 5. The subject vehicle position may be recognized using the map information stored in the memory unit 12 and the peripheral information of the subject vehicle detected by the external sensor group 1, and thus the subject vehicle position can be recognized with high accuracy. The movement information (a moving direction and a moving distance) of the subject vehicle may be calculated on the basis of the detection values by the internal sensor group 2, and the subject vehicle position may be recognized accordingly. When the subject vehicle position can be measured by a sensor installed on a road or outside a road side, the subject vehicle position can be recognized by communicating with the sensor via the communication unit 7.

The exterior environment recognition unit 14 recognizes an external situation around the subject vehicle on the basis of signals from the external sensor group 1 such as the LiDAR, the radar, and the camera. For example, a position, a speed, and an acceleration of a surrounding vehicle (a forward vehicle or a rearward vehicle) traveling around the subject vehicle, a position of a surrounding vehicle stopped or parked around the subject vehicle, and positions and states of other objects are recognized. Other objects include a sign, a traffic light, a road, a building, a guardrail, a utility pole, a signboard, a pedestrian, a bicycle, and the like. Indications such as division lines (such as white lines) and stop lines on a road surface are also included in other objects (roads). The states of other objects include a color (red, green, or yellow) of a traffic light, a moving speed and a direction of a pedestrian or a bicycle, and the like. A part of the stationary object among the other objects constitutes a landmark serving as an index of the position on the map, and the exterior environment recognition unit 14 also recognizes the position and type of the landmark.

The action plan generation unit 15 generates a driving path (target path) of the subject vehicle from the current point of time to a predetermined time ahead on the basis of, for example, the target route calculated by the navigation unit 6, the map information stored in the memory unit 12, the subject vehicle position recognized by the subject vehicle position recognition unit 13, and the external situation recognized by the exterior environment recognition unit 14. When there are a plurality of paths that are candidates for the target path on the target route, the action plan generation unit 15 selects, from among the plurality of paths, an optimal path that satisfies criteria such as compliance with laws and regulations and efficient and safe traveling, and sets the selected path as the target path. Then, the action plan generation unit 15 generates an action plan corresponding to the generated target path. The action plan generation unit 15 generates various action plans corresponding to overtaking to pass a preceding vehicle, changing a lane to change a traveling lane, following a preceding vehicle, lane keeping to maintain a lane without departing from a traveling lane, decelerating or accelerating, and the like. At the generation of the target path, the action plan generation unit 15 first determines a travel mode, and then generates the target path on the basis of the travel mode.

In the self-drive mode, the driving control unit 16 controls each of the actuators AC so that the subject vehicle travels along the target path generated by the action plan generation unit 15. More specifically, the driving control unit 16 calculates a requested driving force for obtaining a target acceleration per unit time calculated by the action plan generation unit 15 in consideration of a travel resistance determined by the road gradient or the like in the self-drive mode. Then, for example, the actuators AC are feedback controlled so that an actual acceleration detected by the internal sensor group 2 becomes the target acceleration. More specifically, the actuators AC are controlled so that the subject vehicle travels at a target vehicle speed and the target acceleration. In the manual drive mode, the driving control unit 16 controls each of the actuators AC in accordance with a travel command (steering operation or the like) from the driver acquired by the internal sensor group 2.

The map generation unit 17 generates the environmental map constituted by three-dimensional point cloud data using detection values detected by the external sensor group 1 during traveling in the manual drive mode. Specifically, an edge indicating an outline of an object is extracted from a camera image acquired by the camera on the basis of luminance and color information for each pixel, and a feature point is extracted using information on the edge. The feature point is, for example, a point on an edge or an intersection of edges, and corresponds to a division line on a road surface, a corner of a building, a corner of a road sign, or the like. The map generation unit 17 calculates a distance to the extracted feature point and sequentially plots the feature point on the environmental map, thereby generating the environmental map around the road on which the subject vehicle has traveled. The environmental map may be generated by extracting the feature point of an object around the subject vehicle using data acquired by the radar or the LiDAR instead of the camera. The map generation unit 17 stores the generated environmental map in the memory unit 12.

The subject vehicle position recognition unit 13 performs subject vehicle position estimation processing in parallel with map generation processing by the map generation unit 17. That is, a position of the subject vehicle is estimated on the basis of a change in a position of the feature point over time. The map generation processing and the position estimation processing are simultaneously performed according to a SLAM algorithm using, for example, signals from the camera or the LiDAR. The map generation unit 17 can generate the environmental map not only when the vehicle travels in the manual drive mode but also when the vehicle travels in the self-drive mode. If the environmental map has already been generated and stored in the memory unit 12, the map generation unit 17 may update the environmental map with a newly obtained feature point.

Meanwhile, when the subject vehicle autonomously travels in the self-drive mode, the driving control unit 16 controls the actuators AC so that the subject vehicle travels in the vicinity of the center of a current lane on the basis of the environmental map generated by the map generation unit 17, more specifically, on the basis of information of division lines included in the environmental map (hereinafter, referred to as virtual division lines). FIG. 2 is a view schematically illustrating the virtual division lines included in the environmental map. FIG. 2 illustrates a view in which virtual division lines RL1 and RL2 that define the current lane are superimposed on a captured image of the front of the subject vehicle obtained by an in-vehicle camera of the subject vehicle traveling on a road RD having two lanes on each side. The division lines L1, L2, and L3 are actual division lines that define the respective lanes of the road RD. The partition wall MS is a median provided between the lanes on each side. When the accuracy of the environmental map is sufficiently high, positions and shapes of the virtual division lines RL1 and RL2 match those of the actual division lines L1 and L2 as illustrated in FIG. 2.

On the other hand, when the accuracy of the environmental map is low, there is a case where the positions and shapes of the virtual division lines are different from the positions and shapes of the actual division lines L1 and L2. In this case, if the subject vehicle autonomously travels along such virtual division lines, there is a possibility that a traveling position of the subject vehicle deviates from the vicinity of the center of the current lane, or departs from the lane in some cases. Therefore, in order to cope with such a problem, in the present embodiment, the map evaluation apparatus is configured as follows.

FIG. 3 is a block diagram illustrating a main configuration of a map evaluation apparatus 50 according to the present embodiment. The map evaluation apparatus 50 constitutes a part of the vehicle control system 100 in FIG. 1. As illustrated in FIG. 3, the map evaluation apparatus 50 includes the controller 10 and a camera 1a.

The camera 1a is a monocular camera having an imaging element (image sensor) such as a CCD or a CMOS, and constitutes a part of the external sensor group 1 in FIG. 1. The camera 1a may be a stereo camera. The camera 1a is mounted at a predetermined position, for example, in front of the subject vehicle, and continuously captures an image of a space in front of the subject vehicle to acquire an image (camera image) of a target object. The target object includes a division line (for example, division lines L1, L2, and L3 in FIG. 2) on a road. Note that the target object may be detected by the LiDAR or the like instead of the camera 1a or together with the camera 1a.

The controller 10 in FIG. 3 includes a recognition unit 111, a reference value calculation unit 112, an evaluation unit 113, an area setting unit 114, and the map generation unit 17 as functional configurations undertaken by the processing unit 11 (FIG. 1). In addition, the controller 10 further includes the memory unit 12.

The recognition unit 111 recognizes an external situation around the subject vehicle. More specifically, a division line of a road on which the subject vehicle travels is recognized. The recognition unit 111 stores recognition information including a recognition result in the memory unit 12. The recognition information includes recognized positions of the division line in an extending direction and a width direction of the road. The recognition information may include a recognized position of the division line in a height direction of the road. The recognition unit 111 constitutes a part of the exterior environment recognition unit 14 in FIG. 1. The recognition information stored in the memory unit 12 by the recognition unit 111 is used for generation of the environmental map in the map generation unit 17.

The reference value calculation unit 112 calculates an evaluation reference value to be used for evaluation of the environmental map generated by the map generation unit 17. Specifically, the reference value calculation unit 112 acquires the recognition information in which the recognized positions (recognized positions in the extending direction of the road) is included in an area to be evaluated from the memory unit 12, and calculates an average value of the recognized positions in the width direction indicated by the acquired recognition information as the evaluation reference value. The area to be evaluated will be described later.

The evaluation unit 113 evaluates the environmental map stored in the memory unit 12. Specifically, the evaluation unit 113 calculates the reliability of the environmental map corresponding to the area to be evaluated on the basis of a deviation of the recognition information, used to calculate the evaluation reference value, from the evaluation reference value. More specifically, first, the evaluation unit 113 calculates a width (hereinafter, referred to as a confidence interval width) of a confidence interval for the evaluation reference value on the basis of the number of samples of the recognition information used to calculate the evaluation reference value and the degree of variation in the deviation of the recognition information (specifically, the recognized positions in the width direction indicated by the recognition information) from the evaluation reference value. The number of samples is the number of times of attempted recognition in the same area to be evaluated, and for example, the number of samples is n when n frames can be measured in the same area to be evaluated. The confidence interval width represents the reliability of the environmental map, and the reliability of the environmental map is higher as the confidence interval width is smaller. That is, the smaller the confidence interval width, the higher the degree of coincidence between a position of a virtual division line on the environmental map and a position of an actual division line. The evaluation unit 113 stores the calculated confidence interval width as an evaluation result in the memory unit 12 in association with position information of the area to be evaluated.

Here, the evaluation reference value and the confidence interval width for the evaluation reference value will be described. FIGS. 4A and 4B are views illustrating an example of recognition information including a recognition result of the division line L1 (a part of the division line L1) in FIG. 2 recognized by the recognition unit 111. FIG. 4A illustrates pieces of recognition information constituting an environmental map having a relatively high reliability, and FIG. 4B illustrates pieces of recognition information constituting an environmental map having a lower reliability than that of FIG. 4A. In FIGS. 4A and 4B, the division line L1 in FIG. 2 is superimposed on the recognition information and indicated by a broken line in consideration of the visibility of the drawing. Black circles RP in the drawings represent the recognition information, more specifically, a recognized position of the division line indicated by the recognition information. An area IP is an area to be evaluated and is an area that is to be evaluated by the evaluation unit 113. A square EP indicates a position (hereinafter, referred to as an evaluation reference position) obtained by averaging the recognized positions of the division line indicated by pieces of the respective recognition information in the area IP to be evaluated, and a coordinate of the evaluation reference position EP in a road width direction indicates an evaluation reference value. As illustrated in FIGS. 4A and 4B, the area IP to be evaluated is an area having a predetermined length in the extending direction of the road. In addition, a length of the area IP to be evaluated in the width direction is determined so as to include all the pieces of recognition information RP existing at a set position of the area IP to be evaluated. The reference value calculation unit 112 calculates the evaluation reference value corresponding to the area IP to be evaluated using the recognition information RP in the area IP to be evaluated. A plurality of areas to be evaluated are set at a predetermined interval in the extending direction of the road, and the evaluation reference value corresponding to each of the areas to be evaluated is calculated on the basis of the recognition information included in each of the areas to be evaluated. In FIGS. 4A and 4B, only one area to be evaluated is illustrated for simplification of the drawing.

FIGS. 5A and 5B are views for describing a confidence interval for the evaluation reference value. FIGS. 5A and 5B illustrate a normal distribution of recognized positions of the division line in the width direction estimated on the basis of the recognition information included in the area IP to be evaluated in FIGS. 4A and 4B. A coordinate X1 in FIG. 5A represents an evaluation reference value calculated on the basis of the recognition information in the area IP to be evaluated in FIG. 4A. A coordinate X2 in FIG. 5B represents an evaluation reference value calculated on the basis of the recognition information in the area IP to be evaluated in FIG. 4B. A double-headed arrow C1 in FIG. 5A represents a confidence interval width calculated on the basis of the evaluation reference value X1. A double-headed arrow C2 in FIG. 5B indicates a confidence interval width calculated on the basis of the evaluation reference value X2. A confidence coefficient of the confidence interval in FIGS. 5A and 5B is 95%. Note that the confidence coefficient of the confidence interval may be other than 95%, such as 99% or 90%. The double-headed arrow AE represents an allowable error (tolerance) with respect to the recognized position of the division line. The tolerance is set in advance according to the confidence coefficient of the confidence interval and recognition accuracy of the division line required for the self-driving capability, and such set information is stored in the memory unit 12.

The evaluation unit 113 calculates the 95% confidence interval using the following the Formula.

95% Confidence Interval = $$\left[ X - t_{0.025}(n-1)\frac{s}{\sqrt{n}},\ X + t_{0.025}(n-1)\frac{s}{\sqrt{n}} \right]$$ Equation 1

In Equation 1, X is an evaluation reference value, n is the number of samples of recognition information, s is a sample standard deviation of recognized positions, and $t_{0.025}(n-1)$ is a t-distribution value of the upper 2.5% point with the degree of freedom n−1.

The evaluation unit 113 determines whether or not the environmental map stored in the memory unit 12 can be used on the basis of the calculated confidence interval width. Specifically, when the confidence interval width is equal to or smaller than the tolerance, the evaluation unit 113 determines that the environmental map corresponding to the area to be evaluated is available for autonomous traveling of the subject vehicle. On the other hand, when the confidence interval width is larger than the tolerance, it is determined that the environmental map corresponding to the area IP to be evaluated is not available for autonomous traveling.

The area setting unit 114 sets the area to be evaluated. Specifically, the area setting unit 114 sets the plurality of areas to be evaluated on the division line on the environmental map at the predetermined interval. Note that the area setting unit 114 changes the set interval of the area to be evaluated on the basis of the reliability of the environmental map of the area to be evaluated (or the area to be evaluated and the vicinity thereof). More specifically, the lower the reliability of the environmental map of the area to be evaluated (or the area to be evaluated and the vicinity thereof), the shorter the set interval of the area to be evaluated. In addition, the area setting unit 114 changes the set interval of the area to be evaluated on the basis of an attribute of the area to be evaluated (or the area to be evaluated and the vicinity thereof). At a spot where road characteristics are likely to change, such as an intersection or a winding road, the area setting unit 114 changes the set interval of the area to be evaluated to be shorter than that at a spot where the road characteristics do not change or the road characteristics change little (for example, a spot where a straight line continues).

FIG. 6 is a flowchart illustrating an example of processing executed by the controller 10. The processing illustrated in this flowchart is started, for example, when the self-drive mode is selected, and is repeated at a predetermined cycle while the subject vehicle is traveling in the self-drive mode.

First, in Step S11, an area to be evaluated is set at a predetermined interval on a target route of the subject vehicle. More specifically, the area to be evaluated is set on the target route at the predetermined interval from a current traveling position of the subject vehicle to a spot a predetermined distance ahead. As described above, the set interval of the area to be evaluated may be changed on the basis of an attribute of the area to be evaluated or a road in the vicinity thereof or the reliability of the environmental map. A different value may be set to the predetermined distance in accordance with a current traveling speed of the subject vehicle. For example, a larger value may be set as the traveling speed of the subject vehicle increases.

Next, in Step S12, the recognition information is read from the memory unit 12. Specifically, the recognition information including a recognized position in the area to be evaluated set in Step S11 is read from the memory unit 12. When a plurality of the areas to be evaluated are set in Step S11, pieces of the recognition information corresponding to each of the areas to be evaluated are individually read.

Next, in Step S13, an evaluation reference value is calculated on the basis of the recognition information read from the memory unit 12 in Step S12. When the plurality of areas to be evaluated are set in Step S11, evaluation reference values corresponding to each of the areas to be evaluated are calculated.

Next, in Step S14, a confidence interval width (reliability) for the evaluation reference value calculated in Step S13 is calculated. In Step S15, it is determined whether or not the confidence interval width calculated in Step S14 is equal to or smaller than a predetermined width (tolerance), that is, whether or not the reliability is equal to or larger than a predetermined degree. When the determination in Step S15 is affirmative, it is determined in Step S16 that the environmental map corresponding to the area to be evaluated is available for autonomous traveling of the subject vehicle. On the other hand, when the determination in Step S15 is negative, it is determined in Step S17 that the environmental map corresponding to the area to be evaluated is not available for autonomous traveling of the subject vehicle. Determination results (hereinafter, referred to as availability information) in Steps S15, S16, and S17 are stored in the environmental map in association with position information of the area to be evaluated. When the plurality of areas to be evaluated are set in Step S11, the determination results corresponding to each of the areas to be evaluated are stored in the environmental map in association with the position information of each of the areas to be evaluated.

In the self-drive mode, when the subject vehicle travels in a section in which the availability information stored in the environmental map indicates "available", the driving control unit 16 controls the actuators AC so that the subject vehicle travels in the vicinity of the center of a current lane on the basis of information of the division line included in the environmental map. On the other hand, when the subject vehicle travels in a section in which the availability information stored in the environmental map indicates "unavailable", the driving control unit 16 lowers a self-driving level by one step or two or more steps, and outputs a command (hereinafter, referred to as a hands-on request command) for requesting the driver to hold the steering wheel via the input/output device 3 (display) as necessary.

According to the present embodiment, the following functions and effects can be achieved.

(1) The map evaluation apparatus 50 includes the recognition unit 111 that recognizes an external situation around a subject vehicle, the memory unit 12 that stores recognition information including a recognition result of the recognition unit 111, the map generation unit 17 that generates a map on the basis of the recognition result of the recognition unit 111, the reference value calculation unit 112 that calculates an evaluation reference value to be used for evaluation of the map on the basis of the recognition information stored in the memory unit 12, and the evaluation unit 113 that calculates the reliability of the map on the basis of a deviation of the recognition information used to calculate the evaluation reference value from the evaluation reference value. The evaluation unit 113 calculates a width of a confidence interval for the evaluation reference value as the reliability on the basis of the number of samples of the recognition information used to calculate the evaluation reference value and the degree of variation in the deviation of the recognition information with respect to the evaluation reference value. This makes it possible to automatically and appropriately determine the probability of the map. In addition, it is possible to determine the availability of the map and to switch the self-driving level on the basis of a result of the determination. Such a self-driving technique can further improve traffic safety and convenience.

(2) The subject vehicle is a vehicle having a self-driving capability or a driving assistance function, and can autonomously travel on the basis of the map generated by the map generation unit 17. The evaluation unit 113 determines whether or not the map generated by the map generation unit 17 is available for autonomous traveling of the subject vehicle on the basis of the calculated reliability. When the reliability is equal to or higher than a predetermined degree, the evaluation unit 113 determines that the map is available. As a result, the autonomous traveling using the highly reliable map is performed, and the safety of the autonomous traveling can be improved.

(3) The map evaluation apparatus 50 further includes the area setting unit 114 that sets an area to be evaluated. The recognition unit 111 recognizes a division line of a road on which the subject vehicle travels, the map generation unit 17 generates the map including information of the division line on the basis of a recognition result of the recognition unit 111, the memory unit 12 stores the recognition information including recognized positions of the division line in an extending direction and a width direction of the road, and the area setting unit 114 sets the area to be evaluated on the division line on the map. More specifically, the area setting unit 114 sets a plurality of the areas to be evaluated at a predetermined interval on the division line on the map. The reference value calculation unit 112 acquires the recognition information in which the recognized position in the extending direction of the road is included in the area to be evaluated from the memory unit 12, and calculates an average value of the recognized positions in the width direction indicated by pieces of the acquired recognition information as the evaluation reference value, and the evaluation unit 113 calculates the reliability of the map on the basis of a deviation of the recognized position in the width direction used for the calculation of the evaluation reference value with respect to the evaluation reference value. This makes it possible to accurately determine the probability of the map.

(4) The memory unit 12 further stores the reliability of the map calculated by the evaluation unit 113. The area setting unit 114 changes the interval between the areas to be evaluated set on the road on the basis of the reliability of the map of the area to be evaluated stored in the memory unit 12. In addition, the area setting unit 114 changes the interval between the areas to be evaluated set on the road on the basis of an attribute of the road. This reduces a processing load on the processing unit 11, and thus, the energy efficiency can be enhanced. As a result, it is possible to contribute to development of a sustainable transportation system.

The above embodiment can be modified into various forms. Hereinafter, some modified examples will be described. In the above embodiment, the external sensor group 1, which is an in-vehicle detection unit such as the camera 1a, detects the external situation around the subject vehicle. However, the external situation may be detected using an in-vehicle detection unit such as the LiDAR other than the camera 1a or a detection unit other than the in-vehicle detection unit.

In the above embodiment, the evaluation unit 113 as a reliability calculation unit calculates the confidence interval width for the evaluation reference value as the reliability on the basis of the number of samples of the recognition information used for calculation of the evaluation reference value and the degree of variation in the deviation of the recognition information with respect to the evaluation reference value. However, the reliability calculation unit may calculate information other than the confidence interval width as the reliability.

In addition, a case where the tolerance is set in advance according to the recognition accuracy of the division line required for the self-driving capability, and such set information is stored in the memory unit 12 is taken as an example in the above embodiment. However, the tolerance may be set to a different value for each self-driving level, or may be set to a different value for each type of driving assistance function. In this case, the evaluation unit 113 as a determination unit reads a value of the tolerance corresponding to a currently set self-driving level or a value of the tolerance corresponding to a type of a currently enabled driving assistance function from the memory unit 12, and performs the determination in Step S15 on the basis of the read value.

In the above embodiment, when the availability information stored in the environmental map indicates "unavailable", the driving control unit 16 as a driving level setting unit lowers the self-driving level by one step or two or more steps, or outputs a hands-on request command. However, the driving level setting unit may notify the driver of switching to a manual drive mode or an advance notice of the switching via the input/output device 3 instead of the hands-on request command. In addition, the driving level setting unit may issue the hands-on request command or the above notification by voice via the input/output device 3 (speaker).

In addition, an example in which the processing of FIG. 6 is repeated at the predetermined cycle when the subject vehicle is traveling in the self-drive mode has been described in the above embodiment. However, the processing of FIG. 6 may be executed at another timing. For example, the processing of FIG. 6 may be executed in response to a command from a user via the input/output device 3. That is, the user may update the availability information included in the environmental map. In this case, the user may be able to designate a range (for example, the entire area of City A, a part of City A (only Section B), or the like) on the environmental map to which the processing of FIG. 6 is applied. In addition, the processing of FIG. 6 may be executed at a preset time interval so that the availability information included in the environmental map is periodically updated.

In the above embodiment, the map generation unit 17 generates the map (environmental map) including information on the division line on the basis of the recognition result of the recognition unit 111, the area setting unit 114 sets the area to be evaluated on the division line on the map, the reference value calculation unit 112 calculates the evaluation reference value (average value of the recognized positions in the width direction of the division line) on the basis of the recognition information included in the area to be evaluated, and the evaluation unit 113 calculates the reliability of the map corresponding to the area to be evaluated on the basis of the deviation from the evaluation reference value. However, the recognition unit may recognize objects other than the division line, for example, road surface indications such as a crosswalk and a stop line, and a road sign installed on the road or around the road, and the map generation unit may generate a map including information on these objects on the basis of the recognition result of the recognition unit. Regarding the crosswalk and the stop line, however, recognition accuracy in the extending direction of the road is regarded as important. Therefore, when a recognition target of the recognition unit is the crosswalk or the stop line, the reference value calculation unit calculates an average value of the recognized positions in the extending direction of the road as the evaluation reference value on the basis of the recognition information included in the area to be evaluated, and the evaluation unit calculates the reliability of the environmental map corresponding to the area to be evaluated on the basis of a deviation from the evaluation reference value. At this time, the area to be evaluated has a predetermined length in the width direction of the road, and a length in the extending direction of the road is determined so as to include all the recognition information existing at a set position of the area to be evaluated. A plurality of the areas to be evaluated may be set at a predetermined interval in the width direction of the road.

In the above embodiment, the example in which the map evaluation apparatus is applied to the self-driving vehicle has been described. That is, although the example in which the self-driving vehicle generates the environmental map has been described, the present invention can be similarly applied to a case where a manual driving vehicle having driving assistance functions generates the environmental map. In this case, the driving level setting unit disables or enables a predetermined driving assistance function (for example, a lane keeping assistance function or a road departure mitigation function) instead of setting the self-driving level. The present invention can be similarly applied to a case where a manual driving vehicle having no driving assistance function generates the environmental map.

The above embodiment can be combined as desired with one or more of the above modifications. The modifications can also be combined with one another.

According to the present invention, map information is appropriately evaluated.

Above, while the present invention has been described with reference to the preferred embodiments thereof, it will be understood, by those skilled in the art, that various changes and modifications may be made thereto without departing from the scope of the appended claims.

What is claimed is:

1. A vehicle control system comprising:
a traveling actuator for controlling traveling of a subject vehicle; and
a microprocessor and a memory coupled to the microprocessor, wherein
the microprocessor is configured to perform:
recognizing a division line of a road on which the subject vehicle travels as an external situation around the subject vehicle to store recognition information including a recognition position of the division line in an extending direction and a width direction of the road in the memory;
generating a map including information on the division line;
setting a plurality of areas to be evaluated on a route extending from a current traveling position of the subject vehicle to a predetermined distance ahead;
acquiring the recognition information in which the recognition position in the extending direction is included in any of the areas to be evaluated;
calculating an average value of recognition positions in the width direction indicated by the recognition information as an evaluation reference value to be used for evaluation of the map;
calculating a reliability of the map based on a deviation between the recognition position used to calculate the evaluation reference value and the evaluation reference value; and
controlling, when the reliability is equal to or larger than a predetermined degree, the traveling actuator so that the subject vehicle travels along the division line based on the information on the division line included in the map, wherein
the memory stores further the reliability of the map, and
the microprocessor is configured to perform
changing the setting of the plurality of areas to be evaluated including shortening a set interval for an area, of the plurality of areas, having a lower reliability, when a reliability corresponding to the area having the lower reliability is already stored in the memory.

2. The vehicle control system according to claim 1, wherein
the microprocessor is configured to perform
the calculating the reliability of the map including calculating a width of a confidence interval for the evaluation reference value as the reliability of the map based on a number of samples of the recognition position used to calculate the evaluation reference value and a degree of variation in the deviation of the recognition position with respect to the evaluation reference value.

3. The vehicle control system according to claim 1, wherein
the subject vehicle is a vehicle having a self-driving capability or a driving assistance function, and is capable of autonomous traveling based on the map,
the microprocessor is configured to further perform
determining whether or not the map is available for the autonomous traveling of the subject vehicle based on the reliability of the map, and
the microprocessor is configured to perform
the determining including determining that the map is available when the reliability of the map is equal to or larger than the predetermined degree.

4. The vehicle control system according to claim 3, wherein
the memory further stores the map, and
the microprocessor is configured to perform
the determining including storing a result of the determining whether or not the map is available for the autonomous traveling in the map stored in the memory.

5. The vehicle control system according to claim 3, wherein
the microprocessor is configured to further perform
controlling the traveling actuator based on the result of the determining and position information stored in the map, and the microprocessor is configured to perform
the controlling the traveling actuator including, when the subject vehicle travels in a section in which the result of the determining indicates the map to be available, the controlling the traveling actuator is based on the information on the division line included in the map so that the subject vehicle travels in a center of a lane defined by the division line.

6. The vehicle control system according to claim 5 further comprising
an output device configured to provide information to a driver, wherein
the microprocessor is configured to perform
the controlling the traveling actuator including, when the subject vehicle travels in a section in which the result of the determining indicates the map to be not available, lowering a self-driving level by one step or two or more steps, or outputting a command for requesting the driver to hold a steering wheel via the output device.

7. The vehicle control system according to claim 1, wherein
the microprocessor is configured to further perform
setting a self-driving level of the subject vehicle based on the reliability of the map.

8. The vehicle control system according to claim 1, wherein
the microprocessor is configured to perform
the changing the setting of the plurality of areas to be evaluated further includes changing an interval between adjacent areas among the plurality of areas to be evaluated based on an attribute of the road on which the plurality of areas are set.

9. The vehicle control system according to claim 8, wherein
the microprocessor is configured to perform
the changing the setting of the plurality of areas to be evaluated further includes shortening a set interval for an area that is set on a road where road characteristics are likely to change, among the plurality of areas.

10. The vehicle control system according to claim 9, wherein
the road where the road characteristics are likely to change includes an intersection and a winding road, and the road where the road characteristics are unlikely to change includes a straight road.

* * * * *